US009601912B2

(12) United States Patent
Motley et al.

(10) Patent No.: US 9,601,912 B2
(45) Date of Patent: Mar. 21, 2017

(54) COMPACT TRANSFORMER BUSHING

(71) Applicant: SCHNEIDER ELECTRIC USA, INC., Palatine, IL (US)

(72) Inventors: Gregory O. Motley, Murfreesboro, TN (US); Jeffrey T. Jordan, Franklin, TN (US)

(73) Assignee: Schneider Electric USA, Inc., Andover, MA (US)

( * ) Notice: Subject to any disclaimer, the term of this patent is extended or adjusted under 35 U.S.C. 154(b) by 185 days.

(21) Appl. No.: 14/312,671

(22) Filed: Jun. 23, 2014

(65) Prior Publication Data
US 2015/0372468 A1    Dec. 24, 2015

(51) Int. Cl.
| | |
|---|---|
| *H02G 3/22* | (2006.01) |
| *H01F 38/20* | (2006.01) |
| *H01F 27/04* | (2006.01) |
| *H02B 11/26* | (2006.01) |
| *H01B 17/50* | (2006.01) |
| *H02B 13/035* | (2006.01) |

(52) U.S. Cl.
CPC ............ *H02G 3/22* (2013.01); *H01F 27/04* (2013.01); *H01F 38/20* (2013.01); *H02B 11/26* (2013.01); *H01B 17/50* (2013.01); *H02B 13/0356* (2013.01); *Y10T 29/49021* (2015.01)

(58) Field of Classification Search
None
See application file for complete search history.

(56) References Cited

U.S. PATENT DOCUMENTS

| | | | | |
|---|---|---|---|---|
| 3,783,434 | A | * | 1/1974 | Ransford, III ......... H01R 13/53 439/281 |
| 3,800,064 | A | * | 3/1974 | Lusk ..................... H02G 15/06 174/11 BH |

(Continued)

FOREIGN PATENT DOCUMENTS

| | | |
|---|---|---|
| EP | 0645782 | 3/1995 |
| EP | 1014389 | 6/2000 |
| JP | S5680611 | 6/1981 |

OTHER PUBLICATIONS

EP Extended Search Report for EP Application No. 15167368.8 dated Oct. 26, 2015, pp. 1-8.

*Primary Examiner* — Dimary Lopez Cruz
(74) *Attorney, Agent, or Firm* — Locke Lord LLP

(57) ABSTRACT

A compact electrical bushing has a separate insulating end cap removably attached to the shaft of the bushing at an end used for mounting a current transformer. The removably attached insulating end cap has a large outer diameter that increases the linear surface distance of the bushing. The outer diameter may be determined in a predefined manner based on the desired length of the shaft, and vice versa, with a larger outer diameter corresponding to a shorter shaft. The increased linear surface distance allows the bushing to meet minimum tracking distance with a shorter shaft relative to existing bushings. The shorter shaft reduces the footprint of switchgear and other electrical isolation equipment to which the bushing may be connected. The insulating end cap may be removed from the bushing as needed to allow the current transformer to be slid onto the bushing without having to pass over the end cap.

10 Claims, 5 Drawing Sheets

(56) References Cited

U.S. PATENT DOCUMENTS

| | | | |
|---|---|---|---|
| 4,670,625 A * | 6/1987 | Wood | H01B 17/301 |
| | | | 174/142 |
| 4,985,599 A | 1/1991 | Eggleston | |
| 5,695,841 A * | 12/1997 | Mazeika | B29C 33/005 |
| | | | 174/176 |
| 6,075,209 A | 6/2000 | Luzzi | |
| 6,747,207 B2 | 6/2004 | Alfonsi et al. | |
| 6,753,750 B1 * | 6/2004 | Posadas-Sanchez | H01F 27/04 |
| | | | 174/142 |
| 7,964,799 B2 | 6/2011 | Isberg et al. | |
| 8,178,801 B2 * | 5/2012 | Yanniello | H02B 11/24 |
| | | | 200/293 |
| 8,913,370 B2 * | 12/2014 | Smith | H05K 5/0217 |
| | | | 174/142 |
| 2004/0251237 A1 | 12/2004 | Meyer et al. | |
| 2011/0299226 A1 | 12/2011 | Milovac et al. | |
| 2011/0299228 A1 | 12/2011 | Milovac et al. | |
| 2013/0186683 A1 | 7/2013 | Xu et al. | |
| 2013/0199837 A1 | 8/2013 | Xu et al. | |
| 2014/0368976 A1 * | 12/2014 | Wu | H02B 11/04 |
| | | | 361/605 |
| 2015/0244156 A1 * | 8/2015 | Kutalek | H02B 11/04 |
| | | | 361/611 |

* cited by examiner

COMPACT TRANSFORMER BUSHING

FIELD OF THE INVENTION

The disclosed embodiments relate generally to an electrical bushing for switchgear and similar electrical isolation equipment, and particularly to a primary side bushing having a reduced overall length for use with such isolation equipment.

BACKGROUND OF THE INVENTION

An electrical bushing is essentially a well-insulated conductor used to transmit power into or out of a wall or other barrier, such as the enclosure of a transformer, circuit breaker, shunt reactor, power capacitor, and other electrical isolation equipment. A primary bushing, as the name suggests, is typically connected to the primary side of a transformer, whereas a secondary bushing is typically connected to the secondary side of the transformer.

The primary bushing is often used in conjunction with a current transformer ("CT") to monitor the current flowing through the bushing conductor. The current transformers are usually window type transformers, also known as "donut" transformers, that have an opening in the middle of the transformer winding. The opening allows the transformer to be slid over the end of the bushing and onto the main body of the bushing where it may be used to measure the amount of current passing through the bushing conductor. To decrease component cost, a smaller size and lower voltage (e.g., 600V) current transformer may be used, provided the inner diameter of the current transformer is large enough to pass over the end of the bushing.

Bushings are regulated by IEEE STD C37.20.2, which requires that the primary bushings be able to withstand certain voltage and over-voltage conditions. The "pass" criteria under these test conditions dictate a certain minimum direct distance from the conductive part of the bushing to the electrical isolation equipment, referred to as the "strike" distance, and also a minimum linear surface distance from the conductive part of the bushing to the nearest ground plane, referred to as the "tracking" or "creep" distance. While these minimum distances may be relaxed slightly by improving the insulating material around the bushing, the "strike" and "tracking" distances ultimately depend on the voltage levels seen by the electrical isolation equipment to which the bushing is connected.

To satisfy the minimum required tracking distance, existing primary bushings are typically designed with coaxial, radially extending insulation discs or sheds that function to increase the linear surface distance along the length of the bushing. By using large diameter tracking sheds, the actual length of the bushing may be reduced while meeting the minimum required tracking distance. Most bushings are designed with the large diameter tracking sheds located on the side of the bushing proximate to the switchgear, which allows that side of the bushing to have a reduced length compared to the other side of the bushing where the current transformer is mounted. The bushing itself is typically connected to a circuit breaker that performs the switching operations within the switchgear. An annular mounting flange may be coaxially disposed on the bushing for securing the bushing to the housing of the switchgear or other electrical isolation equipment.

The side of the bushing over which the current transformer is mounted usually cannot accommodate any tracking sheds because the inner diameter of a typical low-voltage current transformer is too small for the transformer to pass over the tracking sheds. As a result, that side of the bushing must extend a certain distance past the current transformer mounting area in order to maintain the minimum required tracking distance to the tip of the bushing conductor. This additional distance not only creates a larger footprint for switchgear and similar electrical isolation equipment that require a bushing, but also increases the material cost of the bushing.

Attempts to address the above drawback have met with limited success. One such effort involves using a two-piece bushing design that allows the bushing to be split into two pieces at a point on the main body so the current transformer may be slid onto one of the pieces. The two pieces of the bushing may then be reconnected after the current transformer is slid into place. However, this design requires that there be a break in the bushing conductor, which can lead to higher conductor resistance.

Thus, a need exists for an improved primary bushing for switchgear and similar electrical isolation equipment that addresses the above and other shortcomings of existing primary bushings.

SUMMARY OF THE DISCLOSED EMBODIMENTS

The disclosed embodiments address the above and other shortcomings of existing bushings by providing a compact bushing for electrical isolation equipment. The compact bushing has a separate insulating end cap that is removably attached to a shaft of the bushing at the end over which the current transformer is mounted. The removably attached insulating end cap has a large outer diameter that acts to increase the linear surface distance of the bushing. The specific outer diameter used may be selected or otherwise determined in a predefined manner based on the length of the shaft desired, and vice versa, with a larger outer diameter corresponding to a greater linear surface distance and a shorter shaft. The increased linear surface distance allows the bushing to meet minimum tracking requirements using a shorter shaft relative to existing bushings, which beneficially reduces the footprint of switchgear and other electrical isolation equipment to which the bushing may be connected. Removing the insulating end cap from the bushing allows the current transformer to be slid onto the bushing without having to pass over the end cap. This make it possible to mount smaller size current transformers and/or current transformers having smaller inner diameters on the bushing.

In some embodiments, the removably attached insulating end cap may include a main body in the form of a cup or similar receptacle made of and/or coated with a cycloaliphatic epoxy or similar nonconductive material. Such a cup shaped main body may have a large diameter outer surface and a hollow interior that creates additional linear surface distance for the bushing. A small outer diameter neck section is provided at the other end of the of the insulating end cap for mounting the insulating end cap on to the shaft of the bushing. The neck section has a coaxial pathway that extends through the insulating end cap and opens up into the receptacle portion for receiving the bushing conductor. In some implementations, the coaxial pathway within the neck section may narrow progressively toward the receptacle portion. A conical or cone shaped washer or gasket may then be attached to the end of the shaft portion of the bushing for connecting the insulating end portion to the shaft portion of the bushing. When thus connected, the coaxial pathway of the neck section fits snugly on the conical or cone shaped washer or gasket and may be held in place by a suitable locking mechanism, such as a twist lock mechanism. It may also be helpful to cover the conical or cone shaped washer or gasket with a dielectric grease to maintain the dielectric properties of the insulating end cap.

In some embodiments, a shoulder section may be provided between the neck section and the main body of the insulating end cap. The shoulder section may have an outer diameter that is larger than the outer diameter of the neck section but smaller than the outer diameter of main body. One or more tracking sheds may be provided on the shoulder section further to increase the linear surface distance of the bushing. In some embodiments, the one or more tracking sheds may have the same diameter as the outer diameter of the main body. Electric field lines may be minimized by using a grounded conductive coating on the outer surface of the insulating end portion.

In general, in one aspect, the disclosed embodiments are directed to a compact bushing for electrical isolation equipment. The compact bushing comprises a shaft, a conductor extending through the shaft, and an insulating end cap removably attached to the shaft at an end thereof, the insulating end cap having a pathway formed therein through which the conductor extends when the insulating end cap is attached to the shaft. The insulating end cap has an outer diameter preselected to increase a tracking distance for the bushing by a predefined amount when the insulating end cap is attached to the shaft.

In general, in another aspect, the disclosed embodiments are directed to a bushing assembly for electrical isolation equipment. The bushing assembly comprises a shaft, a conductor extending through the shaft, and an insulating end cap removably attached to the shaft at an end thereof. A current transformer is mounted on the shaft that has an inner diameter that is larger than an outer diameter of the shaft, but smaller than an outer diameter of the insulating end cap.

In general, in still another aspect, the disclosed embodiments are directed to a method of mounting a current transformer on a bushing. The method comprises the steps of detaching an insulating end cap from a shaft of the bushing, the insulating end cap being removably attached to the shaft at an end thereof, and sliding the current transformer over the shaft, the current transformer having an inner diameter that is larger than an outer diameter of the shaft, but smaller than an outer diameter of the insulating end cap. The insulating end cap may then be reattached to the shaft at the end thereof, wherein the outer diameter of the insulating end cap is preselected to increase a tracking distance for the bushing by a predefined amount when the insulating end cap is attached to the shaft.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
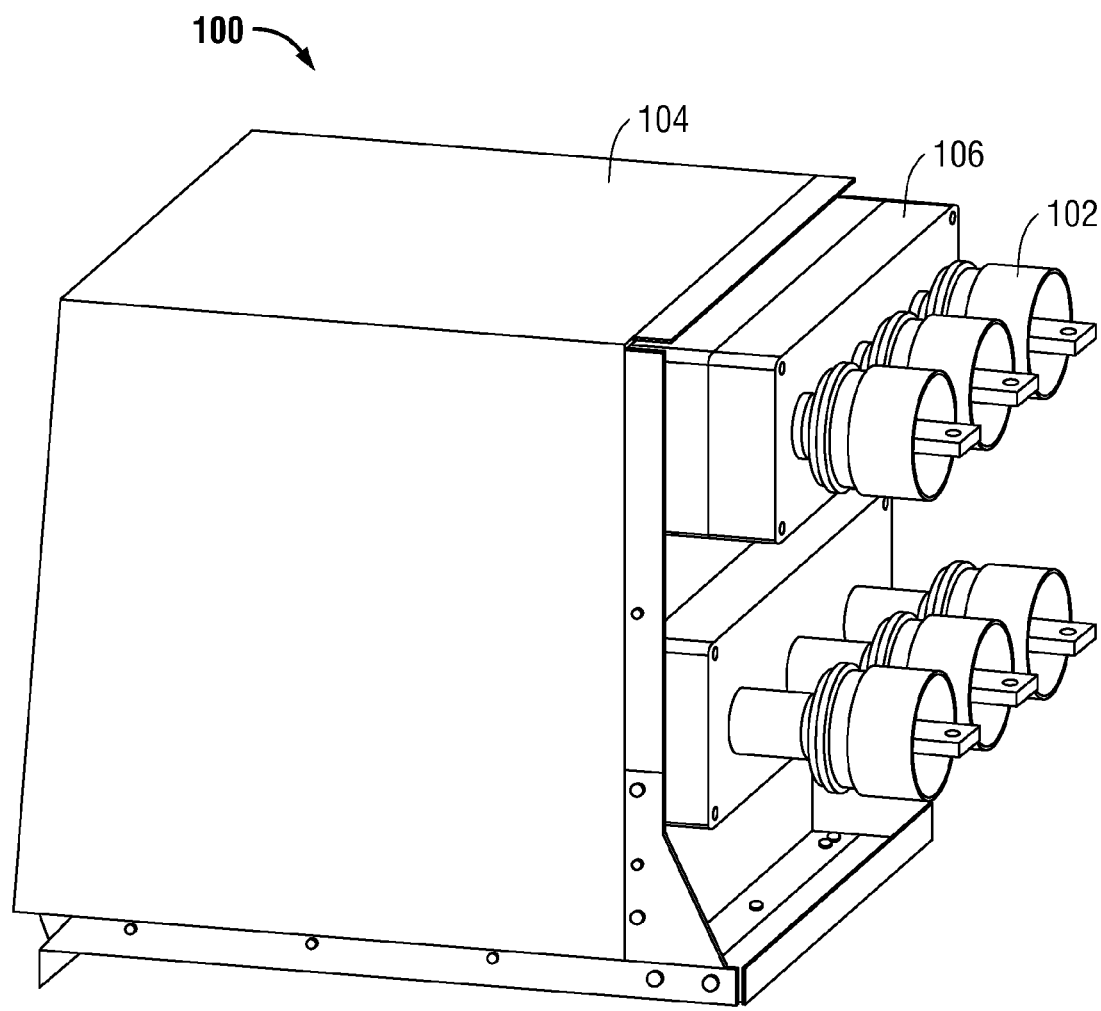
FIG. 1 is a perspective view of a switchgear having a bushing according to some implementations of the disclosed embodiments.

Referring now to FIG. 1, an exemplary switchgear 100 is shown with several of the compact bushings disclosed herein, one of which is indicated at 102, connected to circuit breakers within the switchgear 100. The compact bushings 102 is arranged so that it extends from within the housing 104 of the switchgear 100 to outside the housing 104 where connection is made to other equipment. Current transformers 106 are mounted on the bushings 102 to help monitor and measure the current flowing from the switchgear 100 through the bushings 102. The current transformers 106 in the example of FIG. 1 have a brick shaped enclosure with openings formed therein to allow the bricks to be slid onto the bushings 102. Multiple such brick shaped enclosures may be mounted on the bushings 102 as needed to monitor and measure the current flowing through the bushings 102.

Figure 2:
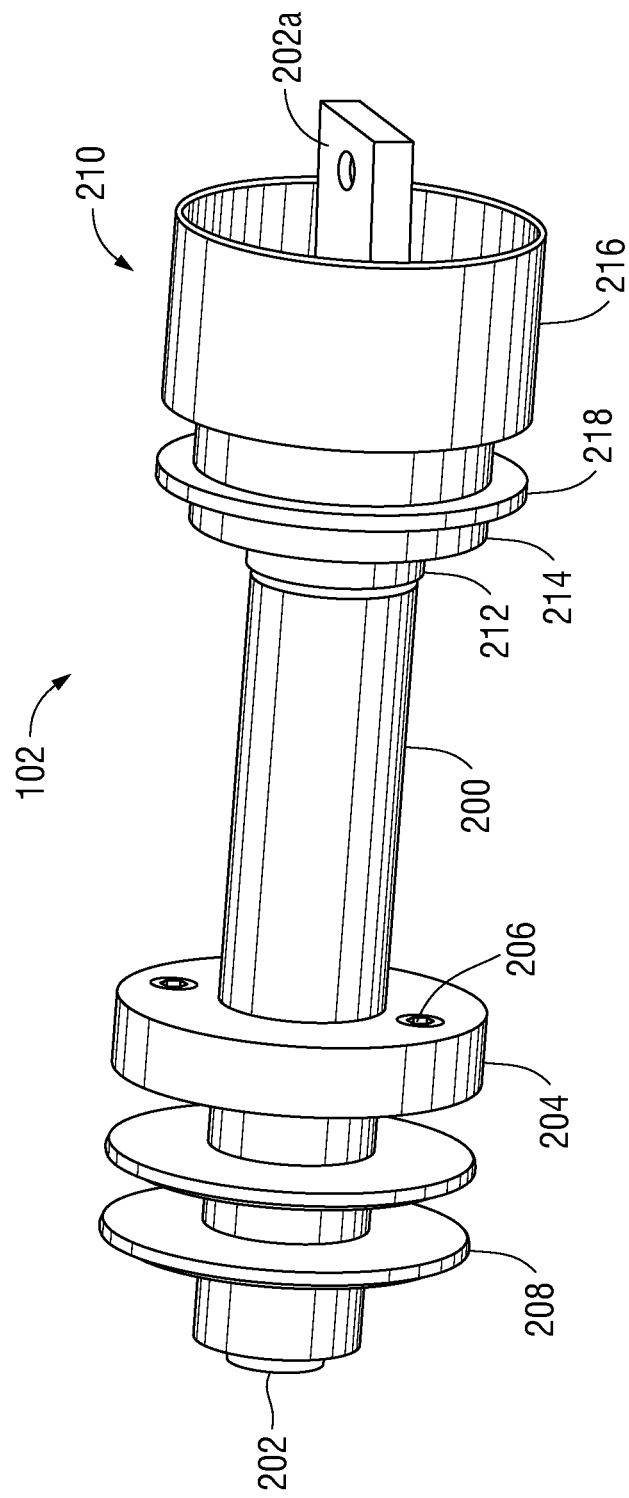
FIG. 2 is a perspective view of a bushing according to some implementations of the disclosed embodiments.

FIG. 2 illustrates one of the compact bushings 102 from FIG. 1 in more detail. As can be seen here, the bushing 102 includes a cylindrical shaft 200 surrounding an electrical conductor 202 extending coaxially through the shaft 200. The cylindrical shaft 200 is made of an insulating material and may also be coated with a grounded conductive coating on the surface in order to manage electric field lines. The electrical conductor 202 has a tip portion 202a at one end that allows the conductor to be connected to other electrical equipment, while the opposite end of the conductor 202 is electrically connected to the switchgear 100 in the usual manner. An annular mounting flange 204 having threaded bores 206 or similar fastening features may be formed in or otherwise disposed on the shaft 200 proximate to the switchgear 100, along with one or more tracking sheds 208, one of which is indicated at 208. The mounting flange 204 allows the bushing 102 to be securely attached to the housing 104 of the switchgear 100, while the one or more tracking sheds 208 act to increase the linear surface distance of the bushing.

In accordance with the exemplary disclosed embodiments, a removable cylindrical end portion or cap 210 may be coaxially connected to one end of the shaft 200, specifically the end adjacent to the tip portion 202a. The cylindrical end cap 210 preferably has a large outer diameter relative to the outer diameter of the shaft 200 in order to increase the linear surface distance of the bushing. The increased linear surface distance allows the bushing 102 to have a shorter shaft 200 relative to existing bushings that do not have a large diameter end cap 210. The end cap 210 may then be detached or otherwise disengaged from the shaft 200 as needed to allow the current transformer 106 to be slid onto the shaft 200 without having to pass over the end cap 210. After the current transformer 106 is slid onto the shaft 200, the end cap 210 may be reattached or otherwise reengaged to the shaft 200.

In the embodiment of FIG. 2, the removable end cap 210 of the compact bushing 102 may be composed of several distinct sections. For example, there may be a neck section 212, a shoulder section 214, and a main body 216, each section being either integrally formed with or otherwise connected to the other sections in the order shown. The neck section 212 may have an outer diameter that is the same or slightly larger than the outer diameter of the shaft 200 portion, but smaller than the outer diameter of the shoulder section 214. The shoulder section 214 in turn may have a smaller outer diameter than the main body 216. It is of course possible for the neck section 212 to have a larger outer diameter than the shoulder section 214, or for the shoulder section 214 to have a larger outer diameter than the main body 216, without departing from the scope of the disclosed embodiments. It is also possible for the end cap 210 to be composed of a single section having a uniform outer diameter along its length without departing from the scope of the disclosed embodiments.

In some embodiments, the main body 216 of the end cap 210 may have the form of a cup, as shown in FIG. 2, and may be made of and/or coated with a cycloaliphatic epoxy or similar nonconductive material. The cup shape gives the main body 216 a hollow interior that provides additional surface area for the bushing, thereby increasing the linear surface distance for the bushing. In alternative embodiments, the main body 216 may have a bowl shape, or some other type of receptacle shape, or it may be completely enclosed with only the tip portion 202a protruding therefrom. Additionally, one or more tracking sheds 218 may be provided on the end cap 210, for example, on the shoulder section 214, to further increase the linear surface distance for the bushing 102. In some embodiments, the one or more tracking sheds 218 may have the same outer diameter as the outer diameter of the main body 216, although their diameters may certainly be different in some embodiments.

Figure 3:
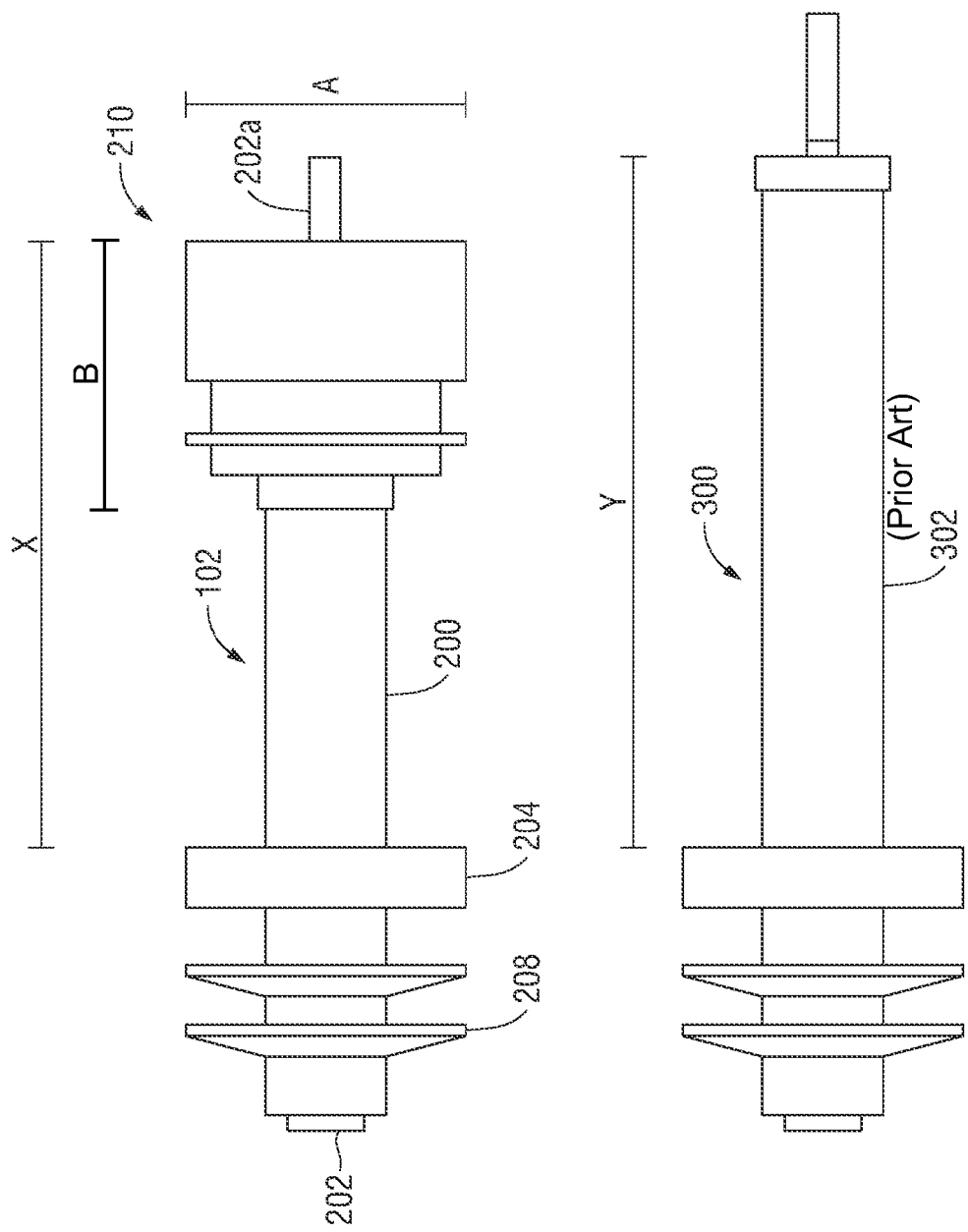
FIG. 3 is side view comparing a bushing according to some implementations of the disclosed embodiments to an existing bushing.

The increased linear surface distance provided by the end cap 210 and the resulting decrease in shaft length are depicted in FIG. 3. In this figure, the bushing 102 according to the disclosed embodiments is on the top and a conventional bushing 300 is on the bottom. Both bushings have roughly the same linear surface distance (e.g., 200 mm), but the top bushing 102 is able to achieve that linear surface distance using a shaft 200 having a length that is substantially shorter than the length of the shaft 302 of the conventional bushing 300. This shorter shaft length is possible because the end cap 210 has a large outer diameter relative to the outer diameter of the shaft 302 of the conventional bushing, thereby providing the top bushing 102 with greater linear surface distance relative to the conventional bushing 300. The increased linear surface distance allows the top bushing 102 to have a shorter overall length compared to the conventional bushing 300.

In the exemplary embodiment of FIG. 3, assuming ±10 percent tolerance, the outer diameter "A" of the end cap 210 may be about 4.5 inches and the length "B" of the end cap 210 may be about 3.3 inches. This allows the bushing 102 to have a length "X" of about 8.0 inches starting from the mounting flange 204 to the end of the bushing 102, not including the tip portion 202a. In contrast, a comparable length "Y" on the conventional bushing 300, which has the same linear surface distance, measures about 11.5 inches. This results in a length reduction of about 30 percent for the bushing 102 disclosed herein over the conventional bushing 300. Moreover, by carefully selecting the dimensions for the end cap 210, particularly the outer diameter "A," specific and targeted length reductions may be achieved, for example, 10 percent, 20 percent, 40 percent, 50 percent, and so on, based on the required minimum linear surface distance.

Figure 4:
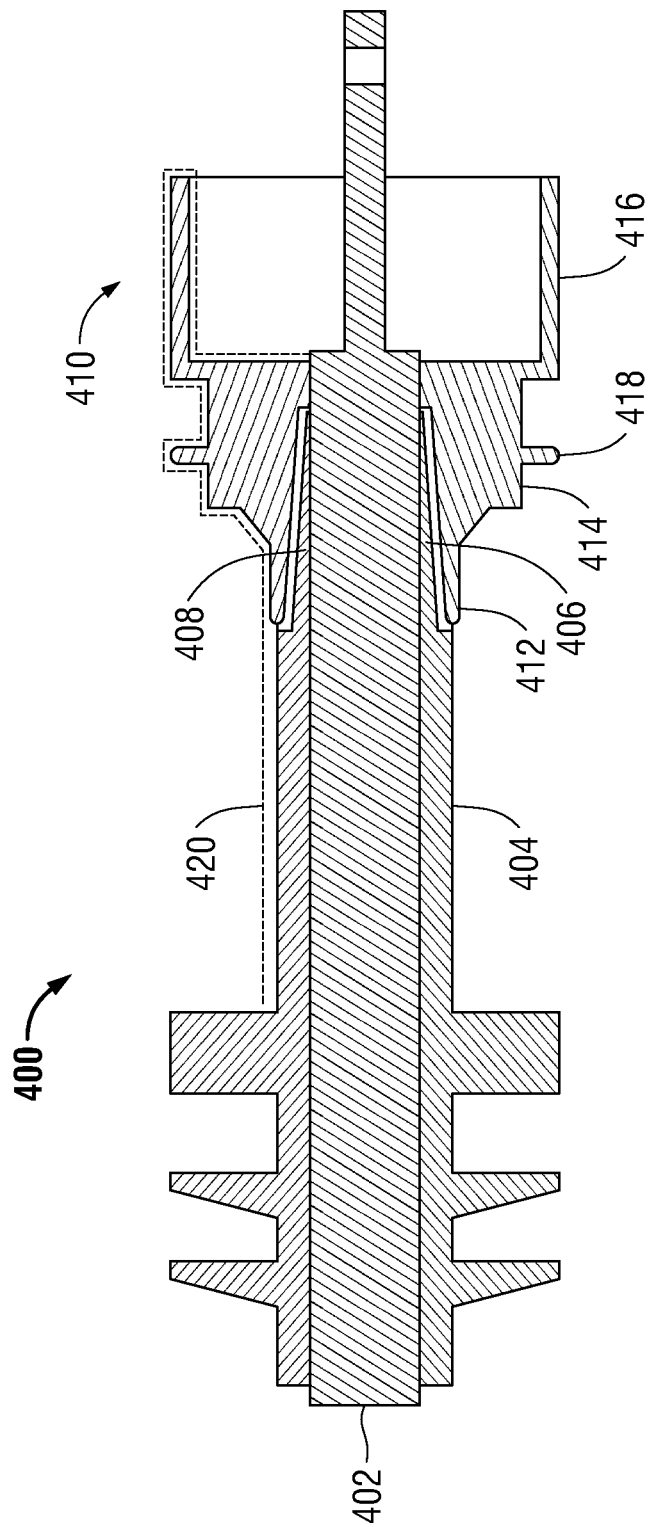
FIG. 4 is a cross-sectional view of a bushing according to some implementations of the disclosed embodiments.

FIG. 4 is a cross-sectional view of another exemplary compact bushing 400 according to the disclosed embodiments. As this view shows, the bushing 400 has an insulating cylindrical shaft 404 through which an electrical conductor 402 extends and a cylindrical end cap 410 removably attached to one end. As with its counterpart, the end cap 410 operates to increase the linear surface distance for the bushing 400 and may be composed of several sections, including a neck section 412, a shoulder section 414, and a cup shaped main body 416. One or more tracking sheds 418 may be provided on the shoulder section 414 to further increase the linear surface distance for the bushing 400. This linear surface distance is indicated by the dashed line 420 running along the outer surface of the bushing 400 into the interior of the cup shaped main body 416.

In the embodiment of FIG. 4, the end cap 410 has a coaxial pathway formed therein that begins at the neck section 412, extends through the shoulder section 414, and opens up into the interior of the cup shaped main body 416. This pathway allows the end cap 410 to removably engage a head portion 406 of the shaft 404 and thereby connect the end cap 410 to the shaft 404. In some embodiments, the pathway in the end cap 410 may narrow progressively from the neck section 412 toward the shoulder section 414, and the head portion 406 of the shaft 404 may be tapered to facilitate insertion of the head portion 406 into the end cap 410. A conical or cone shaped washer or gasket 408 may be disposed between the head portion 406 and the end cap 410 to ensure a snug fit. It may also be beneficial to cover the conical or cone shaped washer or gasket 408 with a dielectric grease to maintain the dielectric properties of the end cap 410.

Figure 5:
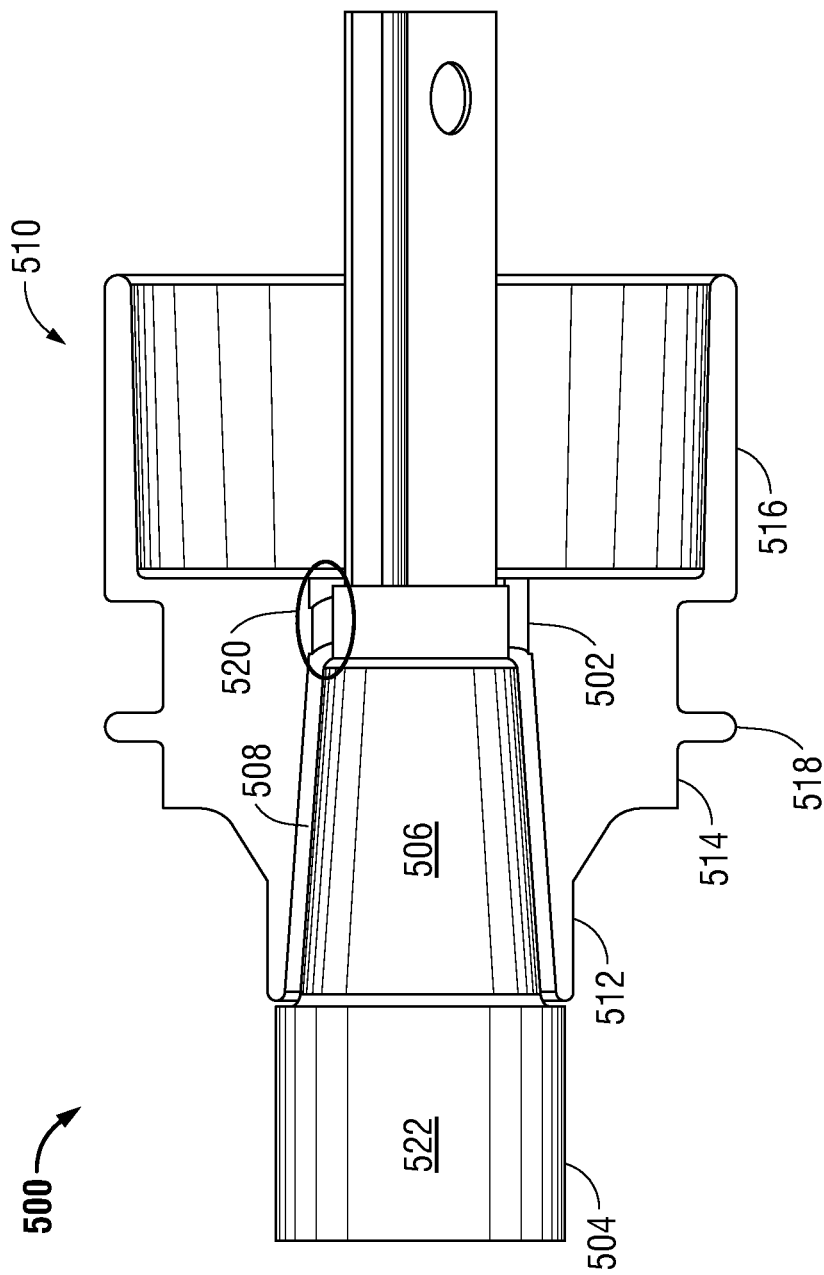
FIG. 5 is a cutaway view of a bushing according to some implementations of the disclosed embodiments.

FIG. 5 is a close up view of yet another exemplary compact bushing 500 according to the disclosed embodiments. The bushing 500 is otherwise similar to the bushing 400 of FIG. 4 insofar as it includes an insulating cylindrical shaft 504, an electrical conductor 502, and a removable cylindrical end cap 510. As before, the end cap 510 may include a neck section 512, a shoulder section 514, a cup shaped main body 516, and a progressively narrowing pathway extending therethrough, while the shaft 504 may have a tapered head portion 506 to facilitate insertion of the head portion 506 into the end cap 510. A shed 518 is shown in this embodiment, but the end cap 510 need not necessarily have separate sheds. A conical or cone shaped washer or gasket 508 may be used to ensure a snug fit between the head portion 506 and the end cap 510, and a dielectric grease may be applied to the gasket to maintain the dielectric properties of the end cap 510. In addition, the bushing 500 may include a locking mechanism 520 for securing the end cap 510 to the shaft 504. Any suitable locking mechanism may be used, such as a quarter turn twist lock, without departing from the scope of the disclosed embodiments. As well, the bushing 500 may include a grounded conductive coating 522 on the surface of the shaft 504 that helps to manage electric field lines.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the disclosed embodiments as defined in the appended claims.

What is claimed is:

1. A compact bushing for electrical isolation equipment, comprising:
    a shaft;
    a conductor extending through the shaft; and
    an insulating end cap removably attached to the shaft at an end thereof, the insulating end cap having a pathway formed therein through which the conductor extends when the insulating end cap is attached to the shaft;
    wherein the insulating end cap has an outer diameter preselected to increase a tracking distance for the bushing by a predefined amount when the insulating end cap is attached to the shaft; and
    a gasket connected to the shaft at the end thereof, the gasket facilitating removable attachment of the insulating end cap to the shaft.

2. The compact bushing of claim 1, wherein the shaft has a predefined length and the outer diameter of the insulating end cap is preselected based on the predefined length of the shaft.

3. The compact bushing of claim 1, wherein the gasket is a cone shaped gasket and the pathway progressively narrows such that the cone shaped gasket fits snugly within the pathway.

4. The compact bushing claim 3, further comprising a coating of dielectric grease covering the gasket, the dielectric grease helping to maintain a dielectric property of the insulating end cap.

5. The compact bushing of claim 1, further comprising a tracking shed coaxially disposed on the insulating end cap and extending radially from the insulating end cap.

6. A bushing assembly for electrical isolation equipment, comprising:
    a shaft;
    a conductor extending through the shaft;
    an insulating end cap removably attached to the shaft at an end thereof; and
    a current transformer mounted on the shaft, the current transformer having an inner diameter that is larger than an outer diameter of the shaft, but smaller than an outer diameter of the insulating end cap;
    wherein the insulating end cap includes a neck section having a progressively narrowing pathway formed therein through which the conductor extends when the insulating end cap is attached to the shaft; and
    a cone shaped gasket connected to the shaft at the end thereof, the cone shaped gasket fitting snugly within the progressively narrowing pathway when the insulating end cap is attached to the shaft.

7. The bushing assembly of claim 6, wherein the outer diameter of the insulating end cap is preselected to increase a tracking distance for the bushing by a predefined amount when the insulating end cap is attached to the shaft.

8. The bushing assembly of claim 7, wherein the insulating end cap includes a cup shaped receptacle portion defining a hollow interior, the cup shaped receptacle further increasing the tracking distance for the bushing by a predefined amount.

9. The bushing assembly of claim 6, wherein the insulating end cap includes a shoulder section, the shoulder section having a tracking shed coaxially disposed thereon and extending radially therefrom.

10. The bushing assembly of claim 9, wherein the tracking shed has an outer diameter that is the same as the outer diameter of the insulating end cap.

* * * * *